United States Patent [19]

Dow

[11] 4,176,875
[45] Dec. 4, 1979

[54] NOVEL WINDSHIELD VISOR SUPPORT AND ADAPTER

[76] Inventor: Walter K. Dow, 86 Converse St., Longmeadow, Mass. 01106

[21] Appl. No.: 919,499

[22] Filed: Jun. 27, 1978

[51] Int. Cl.$^2$ ............................................. B60J 3/02
[52] U.S. Cl. ........................... 296/97 K; 160/DIG. 3
[58] Field of Search ............... 296/97 R, 97 H, 97 K, 296/97 J, 97 G; 160/DIG. 3

[56] References Cited

U.S. PATENT DOCUMENTS

| | | | |
|---|---|---|---|
| 1,868,031 | 7/1932 | Sudbrink | 296/97 K |
| 1,898,276 | 2/1933 | Van Dresser | 296/97 K |
| 2,220,429 | 11/1940 | Soderberg | 296/97 K |
| 2,878,714 | 3/1959 | Van Denburg | 296/97 K |
| 2,917,186 | 12/1959 | Beets | 296/97 K |
| 2,965,416 | 12/1960 | Dryden | 296/97 K |
| 3,059,961 | 10/1962 | Jacobs | 296/97 K |
| 3,477,678 | 11/1969 | Icke et al. | 296/97 K |

*Primary Examiner*—Richard A. Bertsch

[57] ABSTRACT

An automobile sun visor assembly includes a mounting bracket and a shaft member rotatably seated therein. Mounted on the shaft member of the bracket is pivot means including a pair of pivot elements rotatable relative to each other about an axis perpendicular to that of the shaft member in the mounting bracket. The visor support rod is carried by the rotatable pivot element and is rotatable about a third axis so that the visor may be moved about a multiplicity of axes to enable it to be positioned at various locations and elevations relative to the mounting bracket. The pivot means may include means to adjust the pressure on the opposed faces of the pivot elements. The assembly may be incorporated in existing visor assemblies by an adapter embodiment.

15 Claims, 7 Drawing Figures

NOVEL WINDSHIELD VISOR SUPPORT AND ADAPTER

BACKGROUND OF THE INVENTION

Most automobiles employ sun visor assemblies which will allow the vehicle operator to block a portion of the sun's rays. The visor is usually positioned above the windshield and may be pivoted into a position to extend across the upper portion of the windshield or of the side window. Most automobiles utilize a visor mounting assembly including a mounting bracket and a spring loaded shaft member rotatable with the bracket which permits pivoting of the shaft member into adjusted positions. The visor itself is pivotable about a support rod carried by the shaft member or integral with it.

Manufacturers of most automobiles employ a visor assembly to protect the driver and another visor assembly to provide shielding for the front seat passenger. When driving up a hill towards the sun, the driver may be blinded by the sun as he reaches the crest of the hill since the visor covers only the top of the windshield and the rays enter therebelow. Moreover, the passenger may find it difficult to place his sun visor at a location where it will adequately block the sun's rays.

Heretofore, it has been proposed to provide multiple sun visor elements to increase the protection available to the driver such as those shown in Beets U.S. Pat. No. 2,917,186; Van Dresser U.S. Pat. No. 1,898,276; Soderberg U.S. Pat. No. 2,220,429; and Dryden, U.S. Pat. No. 2,965,416.

It has also been proposed to mount the sun visor on a special mounting bracket which would provide substantially universal rotation about a single point as for example in Icke et al U.S. Pat. No. 3,477,678 and Swider et al U.S. Pat. No. 2,784,028.

It is an object of the present invention to provide an automobile sun visor assembly which is relatively simple in construction and relatively easily manipulated to enable positioning of a single visor in multiplicity of adjusted positions relative to the windshield and side window.

It is also an object to provide such an assembly by means of an adapter for an existing visor mounting assembly on the automobile and which may be readily installed.

Another object is to provide such a sun visor mounting assembly which is relatively simple and economical to fabricate and which may be directly mounted upon the vehicle chassis, to provide a wide range of adjusted positions for the visor.

SUMMARY OF THE INVENTION

It has now been found that the foregoing and related objects may be readily attained in an automobile sun visor assembly which includes a mounting bracket adapted to be mounted upon the vehicle chassis adjacent the windshield. Rotatably seated in the mounting bracket and extending therethrough is a shaft member which is rotatable within the mounting bracket about a first axis of rotation. On the shaft member outwardly of the mounting bracket is pivot means which includes a first pivot element mounted on the shaft member, a shaft seated therein and a second pivot element carried by the shaft and pivotable with respect to the first pivot element about a second axis substantially perpendicular to the first pivotal axis of the shaft member in the mounting bracket. A visor support rod is carried by the second element, and the associated visor carried by the visor support rod may be pivoted about the support rod, and the shaft member may be pivoted about the first mentioned axis and the support rod may be pivoted about the second axis to effect movement of the visor about a mulplicity of axes for disposition at various locations and elevations relative to the mounting position of the bracket on the vehicle chassis.

In the preferred embodiment, the pivot means includes means for adjusting the pressure on the opposing faces of the pivot elements and thereby the ease with which the pivot elements may be pivoted relative to each other. The assembly will normally include an elongated sun visor pivotably carried upon the visor support rod for rotation thereabout.

In one embodiment, the shaft member has a shaft portion extending through the mounting bracket and coaxially with the first axis of rotation and a rod portion extending substantially perpendicularly to the shaft portion with the pivot means being disposed upon the rod portion. The pivot means is releasably engaged upon the rod portion and includes means for locking the pivot means upon the rod portion. A washer is interposed between the pivot elements, and there is provided means preventing movement of the washer relative to one of the pivot elements.

In another embodiment, the shaft member extends substantially rectilinearly and coaxially with the first axis of rotation and the opposing faces on the first and second pivot elements lie in a plane substantially parallel to the first axis of rotation. Conveniently, the first pivot element is integrally formed with the shaft member and a washer is disposed between the opposed faces of the pivot elements. The assembly also includes means for preventing movement of the washer relative to one of the pivot elements and means for adjusting the pressure on the opposing faces of the pivot elements and thereby the ease with which the pivot elements may be pivoted relative to each other.

In its most desirable aspect, the pressure adjusting means comprises a locking member on the shaft of the pivot means disposed adjacent the surface of the second pivot element which is opposite its face opposing the first pivot element. The rotation preventing means comprises an axial projection on one of the washer or the pivot element as to which it does not rotate and a recess on the other of these cooperating elements and in which the projection is seated.

DETAILED DESCRIPTION OF THE ILLUSTRATED EMBODIMENTS

Figure 1:
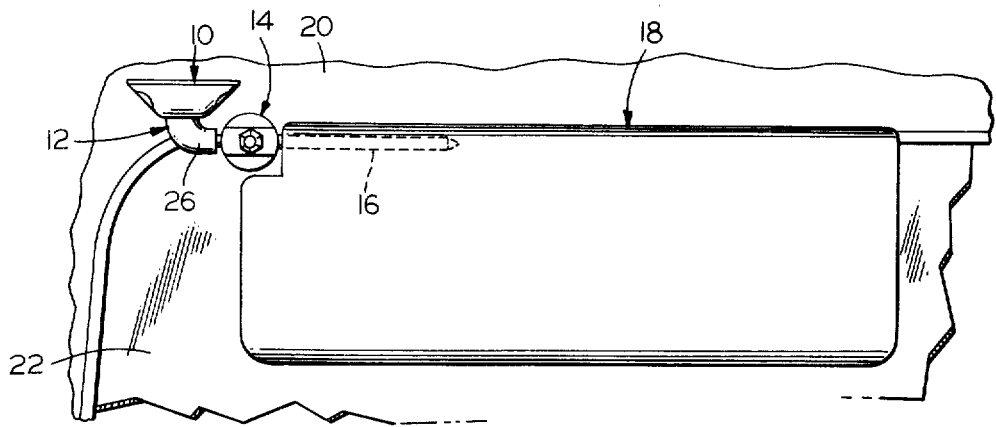
FIG. 1 is a fragmentary elevational view of an automobile adjacent the windshield and including an automobile sun visor assembly embodying the present invention and with the sun visor rotated downwardly into a position to block partially the sun's rays.
Figure 2:
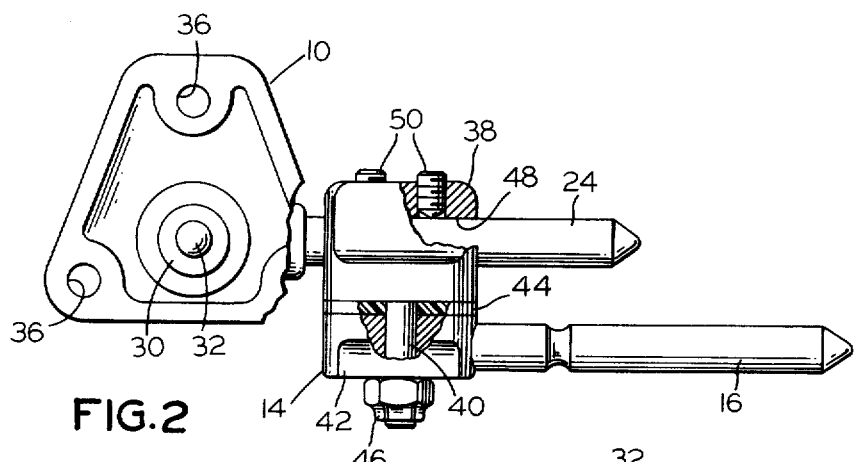
FIG. 2 is a plan view of the sun visor assembly of FIG. 1 with portions thereof in section and with the sun visor removed for clarity of illustration, the scale being enlarged from that in FIG. 1.
Figure 3:
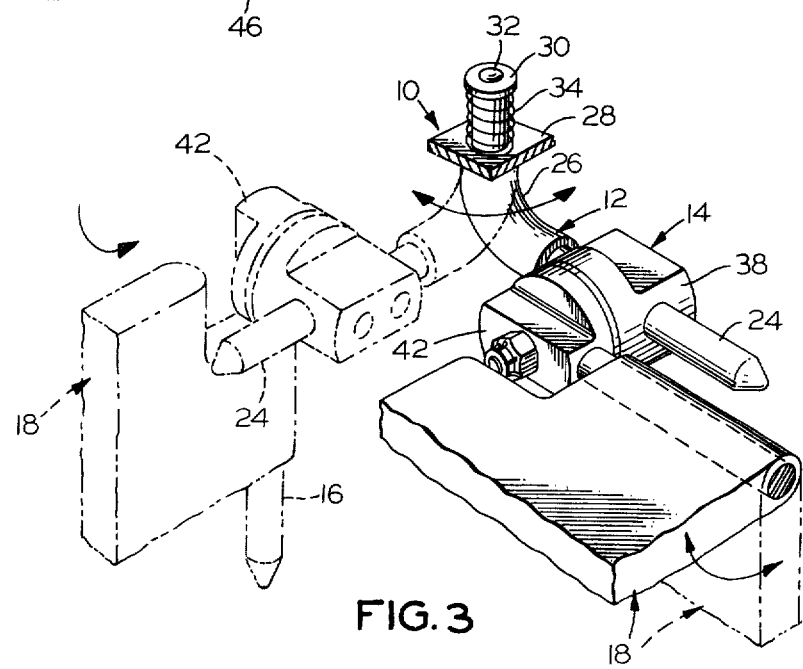
FIG. 3 is a perspective view of the sun visor assembly of FIG. 1 with the bracket partially broken away and with the visor assembly shown in full line in one position and in phantom line in other pivoted positions thereof.
Figure 4:
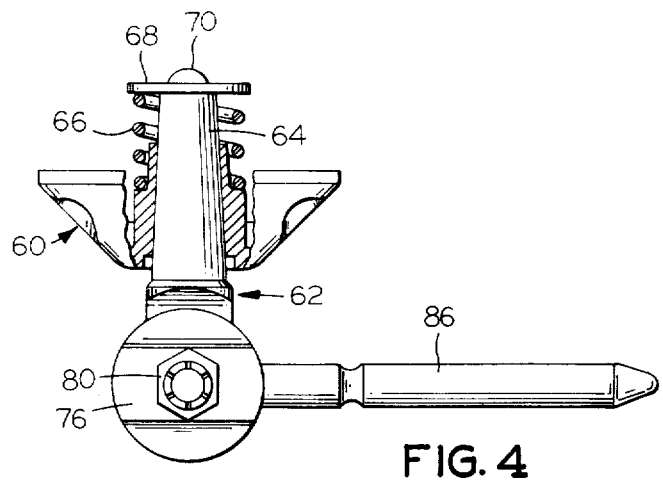
FIG. 4 is a front elevational view of another embodiment of the sun visor assembly of the present invention with the sun visor removed and with portions in section for clarity of illustration.
Figure 5:
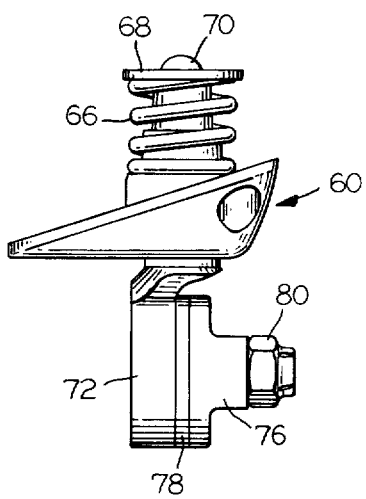
FIG. 5 is a side elevation view thereof.
Figure 6:
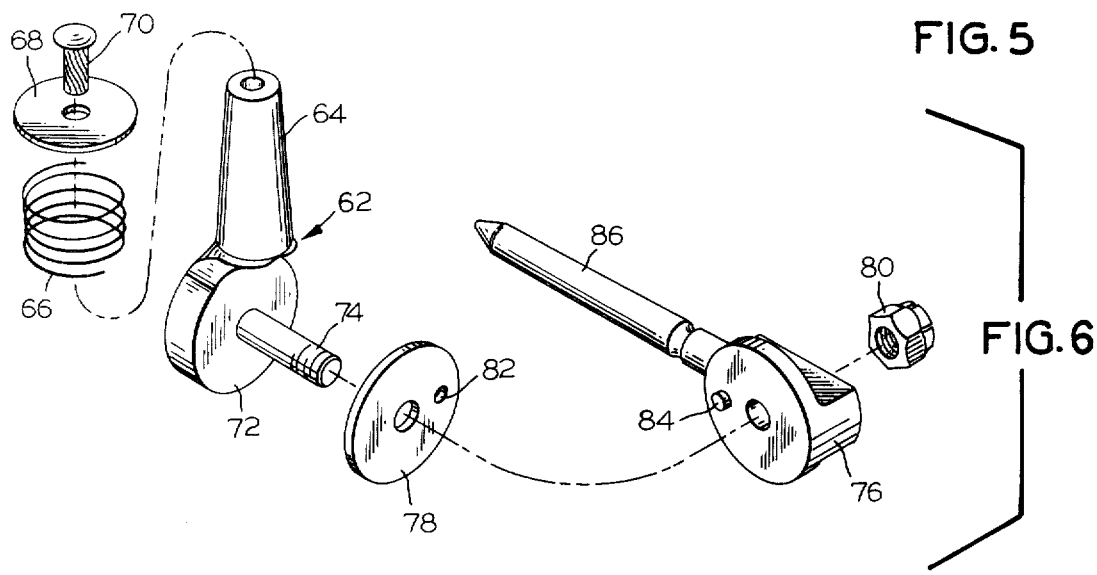
FIG. 6 is an exploded view of the pivot means.
Figure 7:
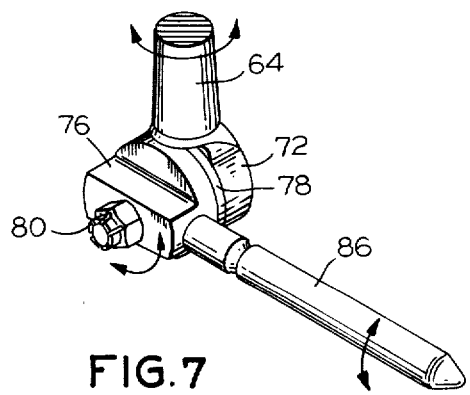
FIG. 7 is a fragmentary perspective view of the pivot means and shaft member wherein the arrows show the directions of rotation of the member and of the pivot means, and of the visor when it is mounted upon the support rod.

Turning now to FIGS. 1-3 of the attached drawing, therein illustrated is an automobile sun visor assembly embodying the present invention and generally comprised of a mounting bracket generally designated by the numeral 10, a shaft member rotatable therein and generally designated by the numeral 12, a pivot member mounted on the shaft member 12 and generally designated by the numeral 14, a visor support rod carried by the pivot member 14 and a visor rotatably carried by the support rod 16 and generally designated by the numeral 18. In accordance with conventional practice, the sun visor assembly is mounted on the chassis 20 above the windshield 22 with the visor support rod 16 extending generally parallel to the upper margin thereof in the normal storage position of the visor 18. In FIG. 1, the visor 18 has been rotated about the support rod 16 downwardly so as to extend across an upper portion of the windshield 22 to shield the driver from the sun's rays.

The embodiment of FIGS. 1-3 employs an add-on attachment for the conventional visor assembly represented by the elements 10, 12 and 18, and the attachment is comprised of the elements 14 and 16. However, in the conventional visor assembly, the visor 18 would be rotatably mounted upon the laterally extending rod portion 24 of the shaft member 12. The L-shaped shaft portion 26 of the shaft member 12 extends through an aperture in the bracket 10 and has an annular washer 30 adjacent its inner end held thereon by the head 32 of shaft portion 26. In accordance with conventional operation and structure, a helical spring 34 disposed about the shaft portion 26 acts between the washer 30 and the inner surface of the bracket 28 to provide a spring force resisting rotation of the shaft member 12 within the bracket 10 to hold it in any adjusted position of rotation. The bracket 10 is secured to the chassis 20 by screws (not shown) which extend through the mounting apertures 36 in the bracket 10.

In this embodiment, the pivot member 14 comprises a first pivot element 38 mounted on the rod portion 24, a shaft 40 seated in the pivot element 38 and a second pivot element 42 which is rotatably mounted on the shaft 40. Between the opposed faces of the pivot elements 38,42 is a washer 44 of a material having a low coefficient of friction such as nylon, and the several elements are secured together by the lock nut 46 which is threadably engaged on the shaft 40.

The pivot element 38 has an aperture 48 extending therethrough substantially perpendicularly to the axis of the shaft 40 and through which the rod portion 24 extends. Set screws 50 lock the pivot element 38 in the desired axial position along the rod portion 24. Seated in an aperture in the pivot element 42 is the visor support rod 16, and it extends substantially parallel to the rod portion 24.

As seen in FIG. 3, the conventional shaft member 12 rotates or pivots about a first axis within the bracket 10 which will normally allow the visor assembly to move from a position extending over the front windshield 22 as shown in FIG. 1 to a position extending over the side window (not shown). The second pivot element 42 is rotatable about a second axis perpendicular to the first axis so that the visor 18 may be disposed at an angle to the upper margin of the windshield 22 or upper margin of the side window (not shown), most usually perpendicularly thereto. Lastly, the visor 18 may be rotated about the support rod 16 about a third axis which is parallel to the first axis.

Turning now to the embodiment of FIGS. 4-7, therein illustrated is a device intended for assembly as original equipment rather than as an adaptation. In this embodiment, the mounting bracket is generally designated by the numeral 60 and is similarly configured. The shaft member is generally designated by the numeral 62 and has a shaft portion 64 extending through the bracket 60 with the helical spring 66 disposed thereabout and with the washer 68 held thereon by the rivet 70.

The outer end of the shaft member 62 has formed integrally therewith the first pivot element 72 as an offset from the axis thereof. Seated in the pivot element 72 is the shaft 74 which extends perpendicularly to the axis of the shaft member 62 and rotatably mounts the second pivot element 76 with the washer 78 therebetween. The pivot elements 72, 76 are held together by the lock nut 80 on the outer end of the shaft 74. In the embodiment, the washer 78 has an aperture 82 therein which seats the pin 84 on the face of the second pivot element 76 to prevent relative rotation therebetween. As a result, only the face of the washer 78 adjacent the first pivot element 72 is subjected to frictional wear.

Lastly, the visor support rod 86 extends from the second pivot element 76 along an axis perpendicular to the axes of rotation of both the pivot members 72,76 and the shaft member 62. Not shown in the visor which is rotatably supported on the support rod 86.

As can be seen, this embodiment is more compact than that of FIGS. 1-3 while providing rotation of the elements about the same three axes so that the visor (not shown) can be positioned at various angles relative to the margins of the windshield and side window.

In both embodiments, the frictional resistance to rotation of the second pivot elements (42,76) relative to the first pivot elements (38,72) may be adjusted by the tightening pressures or torque applied to the lock nut (46,80).

As will be readily appreciated, the embodiment of FIGS. 1-3 lends itself to adaptation of existing automobile visor installations. The visor itself is removed from the standard visor support rod and the adapter assembly is mounted upon the visor and locked in the desired position. The visor is then remounted upon the support rod of the adapter assembly. Alternatively, the existing visor assembly may be removed and the assembly of FIGS. 4-7 substituted therefore; however, this embodiment is conveniently employed in an initial assembly.

In either one of the embodiments, it can be seen that there is provided means for controlling the ease with which the pivot elements may be rotated relative to each other. This is conveniently affected by providing the washer between the opposing surfaces of the pivot elements and then tightening the lock nut upon the shaft until the desired amount of pressure is generated at the bearing surfaces. Alternatively, a spring member could be mounted about the portion of the shaft extending outwardly of the second pivot element to provide tension in a fashion similar to that employed upon the shaft portion of the shaft member. It will be appreciated that such a structure would generally require additional space and be less attractive.

In the illustrated embodiments, the washer is shown as fabricated from a synthetic resin exhibiting a low coefficient of friction such as nylon, high density polyethylene and polyacetal. Alternatively, a bearing metal may be employed. Moreover, if metal is employed, a washer of conical configuration such as a Bellville washer may be utilized to generate a part of the pressure on the opposing faces of the pivot elements so as to resist undesired relative rotation.

Desirably the washer is prevented from rotation relative to one of the pivot elements so that wear will be minimized and limited to the one face of the washer. In the illustrated embodiments, this is accomplished by providing a pin on the face of the pivot element which extends into an aperture or recess in the washer. Obviously, the arrangement may be reversed, and the shaft may be provided with a portion of polygonal cross section which cooperates with an aperture of similar configuration in the washer, or one of the pviot elements may be provided with a recess cooperating with a noncircular cross section for the washer to seat therewithin relative rotation. Various other techniques may be employed if so desired.

In accordance with conventional construction, the visor has a pocket of circular cross section in which is seated the visor support rod. The pocket and rod are cooperatively dimensioned to provide the desired degree of resistance to relative rotation. In some structures, the visor includes a sleeve of metal or the like in which is seated the support rod.

Although the parts have been shown as fabricated from metal with the exception of the washer, it will be appreciated that the several parts may be fabricated from synthetic resins and composite materials if so desired.

From the foregoing detailed description and attached drawings, it can be seen that the automobile sun visor assembly of the present invention affords a highly desirable degree of adjustability for the sun visor not only along the upper margins of the windshield and side window but also along the adjacent side margins. The visor assembly in one which may be fabricated readily and relatively economically and may be assembled easily in existing automobile installations or in automobiles being initially manufactured. The parts of the visor assembly may be fabricated from relatively wear resistant materials to provide a long lived structure.

Having thus described the invention, I claim:

1. In an automobile sun visor assembly, the combination comprising:
   a. a mounting bracket adapted to be mounted upon a vehicle chassis adjacent the windshield;
   b. a shaft member rotatably seated in said mounting bracket and extending therethrough, said shaft member being rotatable within said mounting bracket about a first axis of rotation;
   c. pivot means on said shaft member outwardly of said mounting bracket and having a first pivot element mounted on said shaft member, a shaft seated therein, a second pivot element carried by said shaft and pivotable with respect to said first pivot element about a second axis substantially perpendicular to said first axis, said pivot elements having opposed faces extending substantially perpendicularly to said second axis of rotation, a washer disposed on said pivot means shaft between said opposed faces of said pivot elements, means preventing rotation of said washer relative to one of said pivot elements, and means for adjusting the pressure on the opposing faces of said pivot elements and said washer; and
   d. a visor support rod carried by said second element, whereby the associated visor carried by said visor support rod may be pivoted about said support rod, and said shaft member may be pivoted about said first axis and said support rod may be pivoted about said second axis to effect movement of the visor about a multiplicity of axes for disposition at various locations and elevations relative to the mounting position of said bracket on the vehicle chassis.

2. The sun visor assembly of claim 1 wherein there is included an elongated sun visor pivotably carried upon said visor support rod for rotation thereabout.

3. The sun visor assembly of claim 1 wherein said shaft member has a shaft portion extending through said mounting bracket and coaxially with said first axis of rotation, said shaft member also having a rod portion extending substantially perpendicularly to said shaft portion, said pivot means being disposed upon said rod portion.

4. The sun visor assembly of claim 3 wherein said pivot means is releasably engaged upon said rod portion and includes means for locking said pivot means upon said rod portion.

5. The sun visor assembly of claim 1 wherein said shaft member extends substantially rectilinearly and coaxially with said first axis of rotation and the opposing faces on said first and second pivot elements lie in a plane substantially parallel to said first axis of rotation.

6. The sun visor assembly of claim 5 wherein said first pivot element is integrally formed with said shaft member.

7. The sun visor assembly of claim 1 wherein said pressure adjusting means comprises a locking member on said shaft of said pivot means disposed adjacent the surface of said second pivot element opposite said opposing face thereof.

8. The sun visor assembly of claim 7 wherein said washer is fabricated of a material exhibiting a low coefficient of friction.

9. The sun visor assembly of claim 8 wherein said rotation preventing means comprises an axial projection on one of said washer and the pivot element as to which it does not rotate, and a recess on the other of said washer and pivot element seating said projection.

10. In an automobile sun visor assembly the combination comprising:
   a. a mounting bracket adapted to be mounted upon a vehicle chassis adjacent the windshield;
   b. a shaft member rotatably seated in said mounting bracket and extending therethrough, said shaft member being rotatable within said mounting bracket about a first axis of rotation, said shaft member having a shaft portion extending through said mounting bracket and coaxially with said first axis of rotation, said shaft member also having a rod portion extending substantially perpendicularly to said shaft portion and disposed outwardly of said mounting bracket;

c. adapter pivot means on said rod portion of said shaft member outwardly of said mounting bracket and having a first pivot element releasably mounted on said shaft member, a shaft seated therein, a second pivot element carried by said shaft and pivotable with respect to said first pivot element about a second axis substantially perpendicular to said first axis, said pivot elements having opposed faces extending perpendicularly to said second axis of rotation, a washer disposed on said pivot means shaft between said opposed faces of said pivot elements, means for adjusting the pressure on the opposing faces of said shaft elements and said washer, and means for locking said pivot means upon said rod portion; and d. a visor support rod carried by said second element, whereby the associated visor carried by said visor support rod may be pivoted about said first axis and said support rod may be pivoted about said second axis to effect movement of the visor about a multiplicity of axes for disposition at various locations and elevations relative to the mounting position of said bracket on the vehicle chassis.

11. The sun visor assembly of claim 10 wherein there is included an elongated sun visor pivotably carried upon said visor support rod for rotation thereabout.

12. The sun visor assembly of claim 10 wherein said pressure adjusting means comprises a locking member on said shaft of said pivot means disposed adjacent the surface of said second pivot element opposite said opposing face thereof.

13. The sun visor assembly of claim 10 wherein said washer is fabricated of a material exhibiting a low coefficient of friction.

14. The sun visor assembly of claim 10 wherein said pivot means includes means preventing movement of said washer relative to one of said pivot elements, said rotation preventing means comprising an axial projection on one of said washer and one pivot element as to which it does not rotate, and a recess on the other of said washer and pivot element seating said projection.

15. The sun visor assembly of claim 10 wherein said pivot means includes means preventing movement of said washer relative to one of said pivot elements.

* * * * *